United States Patent
Tan et al.

(10) Patent No.: US 12,281,564 B2
(45) Date of Patent: Apr. 22, 2025

(54) METHOD FOR PREDICTING WATER INVASION FRONTIER FOR COMPLEX WELL IN BOTTOM-WATER GAS RESERVOIR

(71) Applicant: Southwest Petroleum University, Chengdu (CN)

(72) Inventors: Xiaohua Tan, Chengdu (CN); Taixiong Qing, Chengdu (CN); Xiaoping Li, Chengdu (CN); Lei Ding, Chengdu (CN); Xian Peng, Chengdu (CN); Longxin Li, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/620,276

(22) Filed: Mar. 28, 2024

(65) Prior Publication Data
US 2024/0328301 A1 Oct. 3, 2024

(30) Foreign Application Priority Data
Mar. 28, 2023 (CN) .......................... 202310310739.1

(51) Int. Cl.
*E21B 47/005* (2012.01)
*E21B 47/07* (2012.01)
*E21B 47/08* (2012.01)
*E21B 47/117* (2012.01)

(52) U.S. Cl.
CPC ............ *E21B 47/005* (2020.05); *E21B 47/07* (2020.05); *E21B 47/08* (2013.01); *E21B 47/117* (2020.05); *E21B 2200/20* (2020.05)

(58) Field of Classification Search
CPC ... E21B 47/005; E21B 47/117; E21B 2200/20
See application file for complete search history.

(56) References Cited

U.S. PATENT DOCUMENTS

2023/0041525 A1* 2/2023 Hong .................. G01V 3/38

OTHER PUBLICATIONS

CN Office Action from CN Application No. 202310310739.1 mailed May 8, 2023, and English translation, 7 pages.

\* cited by examiner

*Primary Examiner* — Bijan Mapar
(74) *Attorney, Agent, or Firm* — Shih IP Law Group, PLLC

(57) ABSTRACT

The present disclosure provides a method for predicting a water invasion frontier for a complex well in a bottom-water gas reservoir. The technical solution is as follows: with consideration of forms of different well types and a gravitational pressure drop in production, a coupled permeability of a corresponding well type acting on a gas-water interface under the action of a baffle plate is expressed by using an equivalent percolation resistance method; a productivity of each infinitesimal section of the corresponding well type is calculated; a position of the gas-water interface is calculated with an equivalent permeability and a pseudo-productivity as characteristic parameters; water breakthrough is determined when there is a point over a water avoidance height, and a change in water invasion frontier form may be expressed with water quality point position data at this time.

2 Claims, 4 Drawing Sheets

METHOD FOR PREDICTING WATER INVASION FRONTIER FOR COMPLEX WELL IN BOTTOM-WATER GAS RESERVOIR

CROSS REFERENCE TO RELATED APPLICATION

This patent application claims the benefit and priority of Chinese Patent Application No. 202310310739.1, filed with the China National Intellectual Property Administration on Mar. 28, 2023, the disclosure of which is incorporated by reference herein in its entirety as part of the present application.

TECHNICAL FIELD

The present disclosure belongs to the field of gas reservoir development, and in particular, to a method for predicting a water invasion frontier for a complex well in a bottom-water gas reservoir.

BACKGROUND

Bottom-water gas reservoirs are often connected to large-scale water bodies, and thus have the following characteristics during development: (1) there is rich reservoir energy that can continuously replenish energy for gas reservoir development to guarantee stable high production of gas reservoirs at early and middle stages; (2) as natural gas is continuously produced from a reservoir, a pressure drop funnel is formed in an immediate vicinity of a wellbore in the reservoir, and coning, cresting, and the like of bottom water will occur, with reservoir seepage gradually changing from a single-phase flow into a gas-liquid two-phase flow; and (3) after breakthrough of water, the productivity of a gas well declines rapidly and a water-gas ratio rises sharply; and if no effective measure is adopted, the production of the gas well may be stopped due to water flooding, etc.

In terms of water invasion frontier research, predecessors have achieved many research results. However, these results mainly focus on obtaining of water breakthrough time and critical parameters. There are few research methods on the coning (cresting) process of bottom water, and further in-depth studies are required. In terms of well types, predecessors' results mainly focus on a straight well and a horizontal well and present almost no water invasion frontier characterization with regard to an inclined well and an undulating well. In practical production, ideal horizontal well and straight well barely exist. Therefore, it is necessary to study complex wells. On the basis of morphological analysis on a water invasion frontier for a complex well, considering the function of a baffle plate is of certain guiding significance for existing development.

SUMMARY

An objective of the present disclosure is to predict a water invasion frontier for a complex well in a bottom-water gas reservoir by using an equivalent percolation resistance method and correcting a coupled permeability in case of heterogeneity in order to solve the existing problems of difficult water invasion frontier prediction for a complex well, indefinite water invasion frontier form characterization, lack of heterogeneous water breakthrough prediction with a baffle plate, and the like.

To achieve the above objective, the present disclosure provides a method for predicting a water invasion frontier for a complex well in a bottom-water gas reservoir, including the following steps:

preparing static parameters of a reservoir, fluid characteristic parameters, production characteristic parameters, and baffle plate characteristic parameters, where the static parameters of the reservoir include a porosity, a reservoir permeability, a formation temperature, a constant interfacial pressure at a gas-water boundary, a reservoir thickness, an initial gas saturation, and an irreducible water saturation; the fluid characteristic parameters include a natural gas relative density, a natural gas viscosity, and a water quality point position; the production characteristic parameters include a well length, a well diameter, a bottom-hole radius, a frictional resistance coefficient of an inner well wall, a water avoidance height, a flowing bottom-hole pressure, and an inclination angle; and the baffle plate characteristic parameters include a length, a width, and a thickness of a baffle plate, a baffle plate position, a baffle plate permeability, and a baffle plate form;

inputting the static parameters of a reservoir, the fluid characteristic parameters, the production characteristic parameters, and the baffle plate characteristic parameters into a predicting model comprising a processor and a memory storing program codes, wherein the processor performs the stored program codes for:

S100: based on different well types, the static parameters, and the production characteristic parameters, calculating a potential φ generated by each infinitesimal section in an infinite formation, assigning an initial pressure $P_{wfi}^0$ in units of MPa to all infinitesimal sections, calculating ideal productivity $q_i^0$ in units of m³/d of each infinitesimal section, and calculating a pressure drop generated when natural gas flows through each infinitesimal section using a multi-phase flow model based on the production characteristic parameters and the calculated ideal productivity;

S200: calculating an equivalent permeability $K_{ij}$ and a coupled permeability $K_{oi}$ based on a relative position of an infinitesimal section and a water quality point, specifically including the following steps:

S2001: obtaining the equivalent permeability by an equation $$K_{ij} = \frac{L}{\frac{L_1}{K_1} + \frac{L_2}{K_2} + \ldots + \frac{L_n}{K_n}}$$

using n equivalent percolation resistance method based on a permeability distribution combined with a positional relationship between each infinitesimal section and a water quality point, where L represents a distance from the water quality point to the infinitesimal section, in units of m; $L_1, L_2, \ldots,$ and $L_n$ represent lengths of corresponding permeability regions in a connecting line, respectively, in units of m; $K_{ij}$ represents the equivalent permeability in a path from the infinitesimal section to the water quality point, in units of mD; and $K_1, K_2, \ldots,$ and $K_n$ represent permeabilities of regions, in units of mD; and S2002: calculating the coupled permeability using a weighting method by a process of dividing a distance of a corresponding infinitesimal section from any water quality point by a sum of distances of the infinitesimal section from all water quality points, which is then multiplied by the equivalent permeability between the corresponding infinitesimal section and any water quality point, and accumulating obtained values to obtain the coupled permeability $K_{oi}$, in units of mD;

S300: performing pressure drop iteration; performing calculation on pressure drop data calculated in S100 and the initial pressure $P_{wfi}^0$ by an equation $$\sum_{i=1}^{N}\frac{\mu}{4\pi K_{Oi}}q_i\varphi_{ij} = p_e - p_j + \rho g(z_i - z_j)$$

to obtain a new corrected infinitesimal section pressure $P_{wfi}^1$, where μ represents the natural gas viscosity, in units of mPa·s; $K_{oi}$ represents the coupled permeability of each infinitesimal section, in units of mD; N represents a number of infinitesimal sections; $q_i$ represents a productivity of an infinitesimal section; $\varphi_{ij}$ represents the potential generated by an ith infinitesimal section in a jth infinitesimal section; $P_e$ represents a constant boundary pressure; $P_j$ represents a bottom-hole pressure, in units of MPa; ρ represents a natural gas density, in units of g/cm³; g represents the gravitational acceleration, in units of cm/s²; $z_i$ and $z_j$ represent longitudinal positions of an infinitesimal section and a water quality point, respectively, in units of m; then calculating the corrected productivity $q_i^1$, repeating step S100, continuously correcting productivity data, and stopping iteration until a difference between a pressure value and a last calculated pressure value is less than one ten-thousandth, the productivity data obtained by calculation at this time being a coupled productivity $q_i$ of each infinitesimal section;

S400: solving a water breakthrough prediction model for different well types with consideration of the baffle plate, and calculating a real influencing effect of an infinitesimal section of a well on a water quality point in combination with the coupled productivity of the infinitesimal section;

S4001: obtaining the equivalent permeability using the method in step S2001 based on the permeability distribution combined with the positional relationship between each infinitesimal section and a water quality point, where the equivalent permeability of a mirror reflection point to a corresponding water quality point is also $K_{ij}^t$; and S4002: obtaining a real productivity of an infinitesimal section under the influence of a water quality point at a corresponding time, defined as a pseudo-productivity $qni_{ij}^t$, based on the equivalent permeability data $K_{11}^t$, $K_{12}^t$, . . . , and $K_{ij}^t$ calculated in step S4001, where the pseudo-productivity is numerically equal to a ratio of an equivalent permeability to a coupled permeability multiplied by the productivity of the corresponding infinitesimal section, in units of m³/d;

S500: obtaining a displacement of each infinitesimal section with parameters in S400 and S4002, specifically including the following steps:

S5001: obtaining a position of a mirror reflection point of the infinitesimal section using a mirror reflection principle, and calculating distances of a water quality point from the infinitesimal section and a reflected infinitesimal section; and S5002: calculating water quality point displacements $dz_{ij}$, $dy_{ij}$, and $dx_{ij}$ in unit times from the pseudo-productivity $qni_{ij}^t$ calculated in S400 combined with basic parameters of natural gas; calculating a displacement of a water quality point caused by each infinitesimal section at each time by the following equation:

$$dz = v_z dt = \sum_{1}^{M}\sum_{-\infty}^{+\infty}\sum_{j=1}^{N}\frac{qni_{ij}(z_i - z_j)}{4\pi\varphi(1 - S_{wi} - S_{gr})[(z_i - z_j) + r_{ij}^2]^{1.5}}dt$$

where dz represents a longitudinal displacement of the water quality point in unit time, in units of m; dt represents the unit time, in units of d; $qni_{ij}$ represents the pseudo-productivity of the ith infinitesimal section for the jth water quality point, in units of m³/d; $z_i$ and $z_j$ represent longitudinal positions of the infinitesimal section and the water quality point, respectively, in units of m; φ represents the porosity, dimensionless; $S_{wi}$ and $S_{gr}$ represent the irreducible water saturation and an irreducible gas saturation, respectively, dimensionless; $r_{ij}$ represents a distance of the water quality point from an x-y plane of the infinitesimal section, in units of m; obtaining displacements in x and y directions, respectively, with changes of a trigonometric function, and after accumulation, updating a real-time position $P_j(X_t, Y_t, Z_t)$ of the water quality point; and S600: repeating steps S400 and S500 by comparing with a position of a wellbore and increasing the unit time in combination with position data in S5002 until a longitudinal height $z_j^t$ of a water quality point in a wellbore region is greater than the water avoidance height $Z_w$, and stopping calculation, current time being water breakthrough time;

outputting, from the predicting model, the water breakthrough time and position data of the water quality point;

plotting a water breakthrough form of an undulating well with a baffle plate by using water quality point data on the day before water breakthrough according to the water breakthrough time obtained by the repetition in S600, and drawing a schematic diagram of a water invasion frontier rising process under circumstance of homogeneity of the different well types, a semi-enclosed baffle plate, and a semi-permeable baffle plate based on water quality point position data from the first day to the day before water breakthrough; and obtaining, from the schematic diagram of the water invasion frontier rising process, a location of water coning, according to which a gas injector is arranged to inject gas for pressure maintaining.

In the method for predicting a water invasion frontier for a complex well in a bottom-water gas reservoir described above, the different well types in S100 have the following differences:

a horizontal well has an inclination angle of 0 and a gravitational pressure drop of 0; an inclined well has a particular inclination angle and a gravitational pressure drop; a straight well is vertical and has a relatively maximum gravitational pressure drop; and an undulating well has a particular inclination angle, varying longitudinal coordinates of well sections, a wavy form, and increased energy in a descending section and an increased pressure drop in a ascending section under the action of gravity.

DETAILED DESCRIPTION OF THE EMBODIMENTS

The present disclosure is further described below with reference to embodiments and the accompanying drawings.

Figure 1:
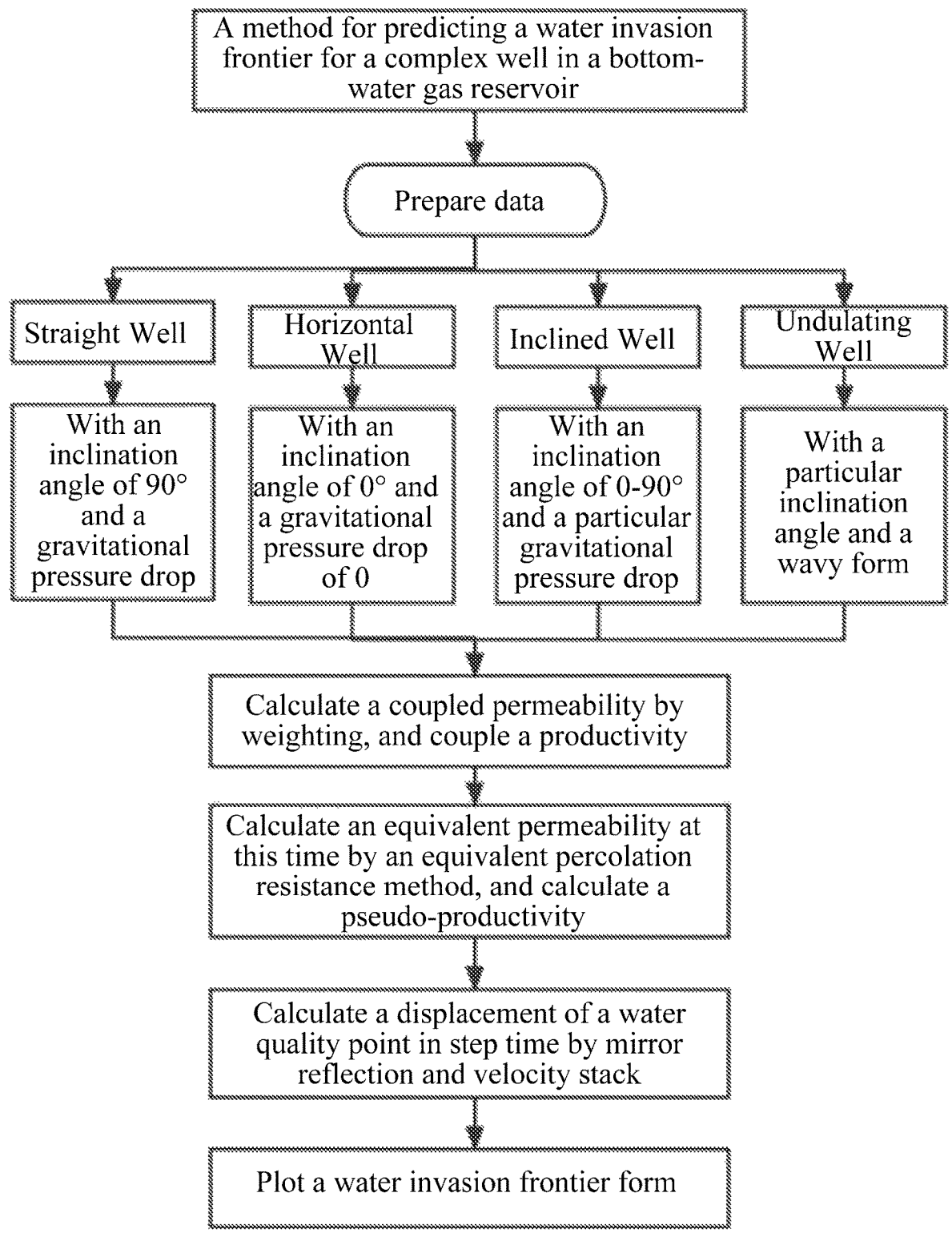
FIG. 1 is a diagram illustrating a technical route of a method according to the present disclosure.

The present disclosure provides a method for predicting a water invasion frontier for a complex well in a bottom-water gas reservoir. FIG. 1 is a diagram illustrating a technical route of the method. The method includes the following steps:

a first step: prepare static parameters of a reservoir, fluid characteristic parameters, production characteristic parameters, and baffle plate characteristic parameters, where the static parameters of the reservoir include a porosity, a reservoir permeability, a formation temperature, a constant interfacial pressure at a gas-water boundary, a reservoir thickness, an initial gas saturation, and an irreducible water saturation; the fluid characteristic parameters include a natural gas relative density, a natural gas viscosity, and a water quality point position; the production characteristic parameters include a well length, a well diameter, a bottom-hole radius, a frictional resistance coefficient of an inner well wall, a water avoidance height, a flowing bottom-hole pressure, and an inclination angle; and the baffle plate characteristic parameters include a length, a width, and a thickness of a baffle plate, a baffle plate position, a baffle plate permeability, and a baffle plate form;

a second step: based on different well types, the static parameters, and the production characteristic parameters, calculate a potential φ generated by each infinitesimal section in an infinite formation, assign an initial pressure $P_{wfi}^0$ in units of MPa to all infinitesimal sections, calculate ideal productivity $q_i^0$ in units of m³/d of each infinitesimal section, and calculate a pressure drop generated when natural gas flows through each infinitesimal section using a multi-phase flow model based on the production characteristic parameters and the calculated ideal productivity; calculate a coupled permeability using a weighting method by a process of dividing a distance of a corresponding infinitesimal section from any water quality point by a sum of distances of the infinitesimal section from all water quality points, which is then multiplied by an equivalent permeability between the corresponding infinitesimal section and any water quality point, and accumulate obtained values to obtain the coupled permeability. The infinitesimal section is obtained by dividing the gas well into multiple small sections.

a third step: perform pressure drop iteration; perform calculation on pressure drop data calculated in the second step and the initial $P_{wfi}^0$ by pressure an equation $$\sum_{i=1}^{N} \frac{\mu}{4\pi K_{Oi}} q_i \varphi_{ij} = p_e - p_j + \rho g(z_i - z_j)$$

to obtain a new corrected infinitesimal section pressure $P_{wfi}^1$; then calculate the corrected productivity $q_i^1$, repeat the second step, continuously correct productivity data, and stop iteration until a difference between a pressure value and a last calculated pressure value is less than one ten-thousandth, the productivity data obtained by calculation at this time being a coupled productivity $q_i$ of each infinitesimal section;

a fourth step: obtain the equivalent permeability $K_{ij}^t$ by an equation $$K_{ij} = \frac{L}{\frac{L_1}{K_1} + \frac{L_2}{K_2} + \ldots + \frac{L_n}{K_n}}$$

using an equivalent percolation resistance method based on a permeability distribution combined with a positional relationship between each infinitesimal section and a water quality point at this time, where the equivalent permeability of a mirror reflection point to a corresponding water quality point is also $K_{ij}^t$; and obtain a real productivity of an infinitesimal section under the influence of a water quality point at a corresponding time, defined as a pseudo-productivity $qni_{ij}^t$, where the pseudo-productivity is numerically equal to a ratio of an equivalent permeability to a coupled permeability multiplied by the productivity of the corresponding infinitesimal section; and a fifth step: calculate a displacement of a water quality point caused by each infinitesimal section at each time by the following equation:

$$dz = v_z dt = \sum_{1}^{M} \sum_{-\infty}^{+\infty} \sum_{j=1}^{N} \frac{qni_{ij}(z_i - z_j)}{4\pi\varphi(1 - S_{wi} - S_{gr})[(z_i - z_j) + r_{ij}^2]^{1.5}} dt;$$

obtain displacements in x and y directions, respectively, with changes of a trigonometric function, and after accumulation, update a real-time position of the water quality point; repeat the fourth step by comparing with a position of a wellbore and increasing the unit time until a longitudinal height $z_j^t$ of a water quality point in a wellbore region is greater than the water avoidance height $Z_w$, and stop calculation. A water breakthrough form of a corresponding gas well can be plotted with the water quality point position data at this time.

Figure 2:
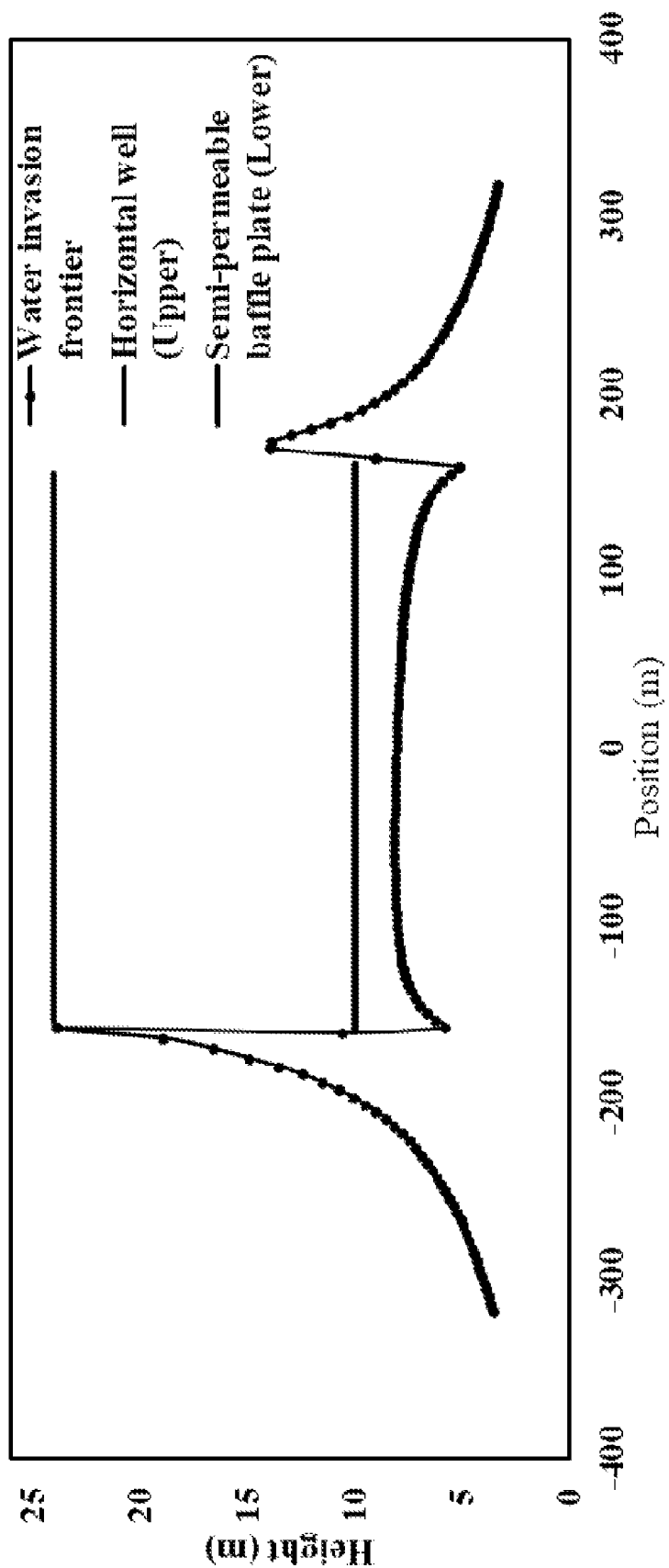
FIG. 2 is a prediction curve chart of a water invasion frontier of a horizontal well with a semi-permeable baffle plate.
Figure 3:
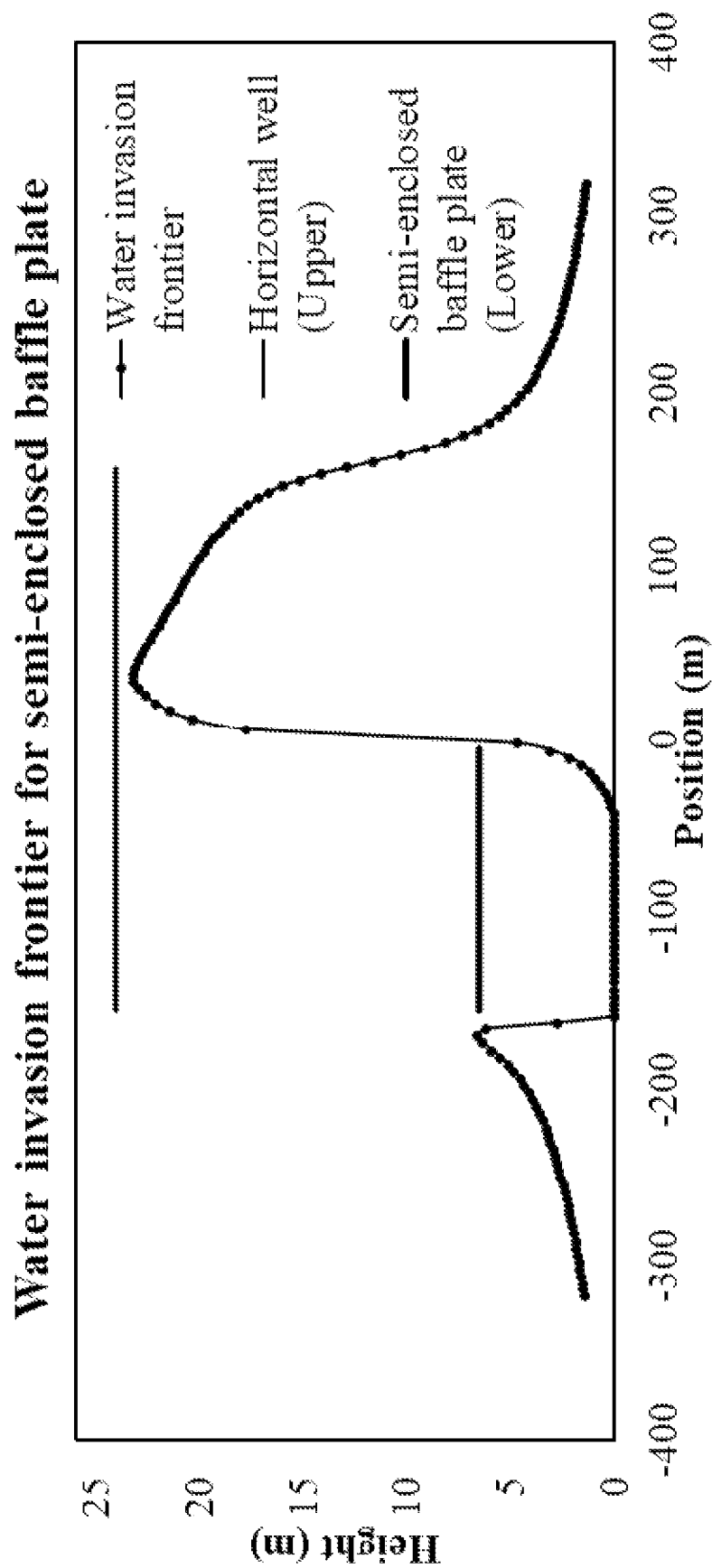
FIG. 3 is a prediction curve chart of a water invasion frontier of a horizontal well with a semi-enclosed baffle plate.

Research is conducted on a method for predicting a water invasion frontier for a complex well in a bottom-water gas reservoir in a gas-water distribution mode with a baffle plate based on a reservoir seepage mirror reflection principle, a complex potential theory, and a velocity stack principle. A method for predicting a water invasion frontier of a straight well and a horizontal well in a bottom-water gas reservoir in a gas-water distribution mode with a baffle plate is established, and water invasion frontier forms for a semi-permeable baffle plate (FIG. 2) and a semi-enclosed baffle plate (FIG. 3) are written, calculated, and plotted using C#language.

Figure 4:
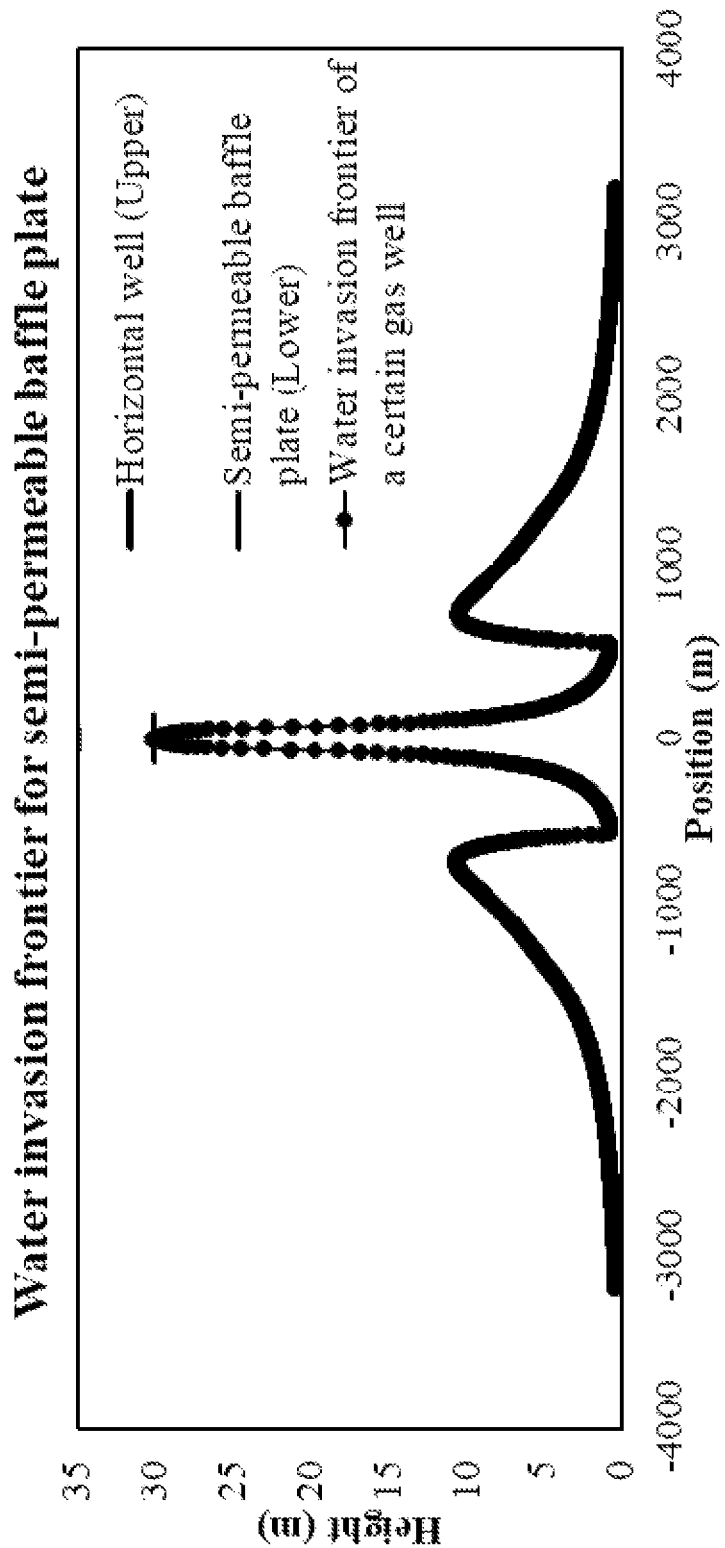
FIG. 4 is a prediction curve chart of a water invasion frontier of a horizontal well in a certain bottom-water gas reservoir.

Taking YB102-2H well for example, YB102-2H was put into production on Dec. 16, 2015, and water broke through on Apr. 1, 2020. The well is a horizontal well, and the production section thereof is 140 m long. Liner-type well completion is adopted. The water avoidance height is 35 m. The inner and outer diameters of the wellbore are 108.62 mm and 127 mm, respectively. The production allocation is 330 thousand m³/day. The initial formation pressure is 69.5 MPa. The reservoir temperature is 150° C. The reservoir permeability is 0.64 mD. The reservoir thickness is 45 m. The reservoir porosity is 0.049. The irreducible water saturation is 0.103. The method for predicting a water invasion frontier with a baffle plate is adopted. The water breakthrough time is calculated to be 1589 days, and the actual water breakthrough time is 1568 days, with a small difference therebetween, which is within an error range. FIG. 4 is a diagram illustrating the water invasion frontier form of the horizontal well.

The prediction of water breakthrough time may provide a basis for ground surface water control plans, such as optimizing the configurations of compressor and separator, increasing the processing capacity of water treatment systems, to ensure stable production of gas wells. The water breakthrough in a gas well is generally caused by the formation water coning. Compared to the water bodies on both sides, the water coning is the main reason for water breakthrough in a gas well. The schematic diagram of a water invasion frontier rising process may provide the location of the water coning. After the water breakthrough in the gas well, gas injector can be deployed on the ground according to the location of the water coning, thereby achieving the effect of maintaining a stable pressure. The gas injection position is the water coning point. The gas, such as nitrogen or carbon dioxide, may be injected into the gas reservoir by the gas injector. On one hand, it blocks the advancement of formation water, and on the other hand, due to the injection of gas, it can maintain pressure stability, and improve the acquisition rate of gas reservoirs.

Compared with existing methods, the present disclosure has the following beneficial effects: (1) a water invasion frontier form is predicted according to mirror reflection and superposition principles, and a predicted water breakthrough time can be given; (2) calculation parameters can be changed according to different well types to adapt to a plurality of complex wells in production; and (3) the water invasion frontier position data at each time is obtained by programming, which is time-saving and labor-saving.

Finally, it should be noted that the above embodiments are merely intended to describe rather than limit the technical solutions of the present disclosure. Although the present disclosure is described in detail with reference to the preferred embodiments, the those skilled art should understand that modifications or equivalent substitutions may be made to the technical solutions of the present disclosure without departing from the spirit and scope of the technical solutions of the present disclosure, and such modifications or equivalent substitutions should be included within the scope of the claims of the present disclosure.

What is claimed is:

1. A method for predicting a water invasion frontier for a complex well in a bottom-water gas reservoir, comprising steps of:

preparing static parameters of a reservoir, fluid characteristic parameters, production characteristic parameters, and baffle plate characteristic parameters, wherein:
the static parameters of the reservoir comprise a porosity, a reservoir permeability, a formation temperature, a constant interfacial pressure at a gas-water boundary, a reservoir thickness, an initial gas saturation, and an irreducible water saturation;
the fluid characteristic parameters comprise a natural gas relative density, a natural gas viscosity, and a water quality point position;
the production characteristic parameters comprise a well length, a well diameter, a bottom-hole radius, a frictional resistance coefficient of an inner well wall, a water avoidance height, a flowing bottom-hole pressure, and an inclination angle; and
the baffle plate characteristic parameters comprise a length, a width, and a thickness of a baffle plate, a baffle plate position, a baffle plate permeability, and a baffle plate form;

inputting the static parameters of the reservoir, the fluid characteristic parameters, the production characteristic parameters, and the baffle plate characteristic parameters into a predicting model comprising a processor and a memory storing program codes, wherein the processor performs the stored program codes for:
S100: based on different well types, the static parameters, and the production characteristic parameters, calculating a potential φ generated by each infinitesimal section in an infinite formation, assigning an initial pressure $P_{wfi}^0$ in units of MPa to all infinitesimal sections, calculating ideal productivity $q_i^0$ in units of m³/d of each infinitesimal section, and calculating a pressure drop generated when natural gas flows through each infinitesimal section using a multi-phase flow model based on the production characteristic parameters and the calculated ideal productivity;
S200: calculating an equivalent permeability $K_{ij}$ and a coupled permeability $K_{oi}$ based on a relative position of an infinitesimal section and a water quality point, S200 comprising steps of:
S2001: obtaining the equivalent permeability by an equation $$K_{ij} = \frac{L}{\frac{L_1}{K_1} + \frac{L_2}{K_2} + \ldots + \frac{L_n}{K_n}}$$

using an equivalent percolation resistance method based on a permeability distribution combined with a positional relationship between each infinitesimal section and a water quality point, wherein L represents a distance from the water quality point to the infinitesimal section, in units of m; $L_1$, $L_2$, ..., and $L_n$ represent lengths of corresponding permeability regions in a connecting line, respectively, in units of m; $K_{ij}$ represents the equivalent permeability in a path from the infinitesimal section to the water quality point, in units of mD; and $K_1$, $K_2$ ..., and $K_n$ represent permeabilities of regions, in units of mD; and
S2002: calculating the coupled permeability using a weighting method by a process of dividing a distance of a corresponding infinitesimal section from any water quality point by a sum of distances of the infinitesimal section from all water quality points, which is then multiplied by the equivalent permeability between the corresponding infinitesimal section and any water quality point, and accumulating obtained values to obtain the coupled permeability $K_{oi}$, in units of mD;

S300: performing pressure drop iteration, including: performing calculation on pressure drop data calculated in S100 and the initial pressure $P_{wfi}^0$ by an equation $$\sum_{i=1}^{N} \frac{\mu}{4\pi K_{Oi}} q_i \varphi_{ij} = p_e - p_j + \rho g(z_i - z_j)$$

to obtain a new corrected infinitesimal section pressure $P_{wfi}^1$, wherein:
  $\mu$ represents the natural gas viscosity, in units of mPa·s,
  $K_{oi}$ represents the coupled permeability of each infinitesimal section, in units of mD,
  N represents a number of infinitesimal sections,
  $q_i$; represents a productivity of an infinitesimal section,
  $\varphi_{ij}$ represents the potential generated by an ith infinitesimal section in a jth infinitesimal section,
  $P_e$ represents a constant boundary pressure,
  $P_j$ represents a bottom-hole pressure, in units of MPa,
  $\rho$ represents a natural gas density, in units of g/cm$^3$,
  g represents the gravitational acceleration, in units of cm/s$^2$, and
  $z_i$ and $z_j$ represent longitudinal positions of an infinitesimal section and a water quality point, respectively, in units of m;

then calculating the corrected productivity $q_i^1$, repeating step S100, continuously correcting productivity data, and stopping iteration until a difference between a pressure value and a last calculated pressure value is less than one ten-thousandth, the productivity data obtained by calculation at this time being a coupled productivity $q_i$ of each infinitesimal section;

S400: solving a water breakthrough prediction model for different well types with consideration of the baffle plate, and calculating a real influencing effect of an infinitesimal section of a well on a water quality point in combination with the coupled productivity of the infinitesimal section, S400 comprising steps of:
  S4001: obtaining the equivalent permeability using the method in step S2001 based on the permeability distribution combined with the positional relationship between each infinitesimal section and a water quality point, wherein the equivalent permeability of a mirror reflection point to a corresponding water quality point is also $K_{ij}^r$; and
  S4002: obtaining a real productivity of an infinitesimal section under the influence of a water quality point at a corresponding time, defined as a pseudo-productivity $qni_{ij}^t$, based on the equivalent permeability data $K_{11}^r, K_{12}^r, \ldots,$ and $K_{ij}^t$ calculated in step S4001, wherein the pseudo-productivity is numerically equal to a ratio of an equivalent permeability to a coupled permeability multiplied by the productivity of the corresponding infinitesimal section, in units of m$^3$/d;

S500: obtaining a displacement of each infinitesimal section with parameters in S400 and S4002, S500 comprising steps of:
  S5001: obtaining a position of a mirror reflection point of the infinitesimal section using a mirror reflection principle, and calculating distances of a water quality point from the infinitesimal section and a reflected infinitesimal section; and
  S5002: calculating water quality point displacements $dz_{ij}$, $dy_{ij}$, and $dx_{ij}$ in unit times from the pseudo-productivity $qni_{ij}^t$ calculated in S400 combined with basic parameters of natural gas; calculating a displacement of a water quality point caused by each infinitesimal section at each time by the following equation:

$$dz = v_z dt = \sum_{1}^{M} \sum_{-\infty}^{+\infty} \sum_{j=1}^{N} \frac{qni_{ij}(z_i - z_j)}{4\pi\varphi(1 - S_{wi} - S_{gr})[(z_i - z_j) + r_{ij}^2]^{1.5}} dt$$

wherein:
  dz represents a longitudinal displacement of the water quality point in unit time, in units of m,
  dt represents the unit time, in units of d,
  $qni_{ij}$ represents the pseudo-productivity of the ith infinitesimal section for the jth water quality point, in units of m$^3$/d,
  $z_i$ and $z_j$ represent longitudinal positions of the infinitesimal section and the water quality point, respectively, in units of m,
  $\phi$ represents the porosity, dimensionless,
  $S_{wi}$ and $S_{gr}$ represent the irreducible water saturation and an irreducible gas saturation, respectively, dimensionless, and
  $r_{ij}$ represents a distance of the water quality point from an x-y plane of the infinitesimal section, in units of m; and obtaining displacements in x and y directions with changes of a trigonometric function, and after accumulation, updating a real-time position $P_j(X_t, Y_t, Z_t)$ of the water quality point; and S600: repeating steps S400 and S500 by comparing with a position of a wellbore and increasing the unit time in combination with position data in S5002 until a longitudinal height $z_j^t$ of a water quality point in a wellbore region is greater than the water avoidance height $Z_w$, and stopping calculation, current time being water breakthrough time;

outputting, from the predicting model, the water breakthrough time and position data of the water quality point;

plotting a water breakthrough form of an undulating well with a baffle plate by using water quality point data on the day before water breakthrough according to the water breakthrough time obtained by the repetition in S600, and drawing a schematic diagram of a water invasion frontier rising process under circumstance of homogeneity of the different well types, a semi-enclosed baffle plate, and a semi-permeable baffle plate based on water quality point position data from the first day to the day before water breakthrough; and obtaining, from the schematic diagram of the water invasion frontier rising process, a location of water coning, according to which a gas injector is arranged to inject gas for pressure maintaining.

2. The method for predicting a water invasion frontier for a complex well in a bottom-water gas reservoir according to claim 1, wherein the different well types in S100 have the following differences:
  a horizontal well has an inclination angle of 0 and a gravitational pressure drop of 0; an inclined well has a particular inclination angle and a gravitational pressure drop; a straight well is vertical and has a relatively maximum gravitational pressure drop; and an undulating well has a particular inclination angle, varying longitudinal coordinates of well sections, a wavy form, and increased energy in a descending section and an increased pressure drop in an ascending section under the action of gravity.

* * * * *